(No Model.)
I. P. MINER & O. T. JENNINGS.
COTTON GIN.
No. 245,086. Patented Aug. 2, 1881.
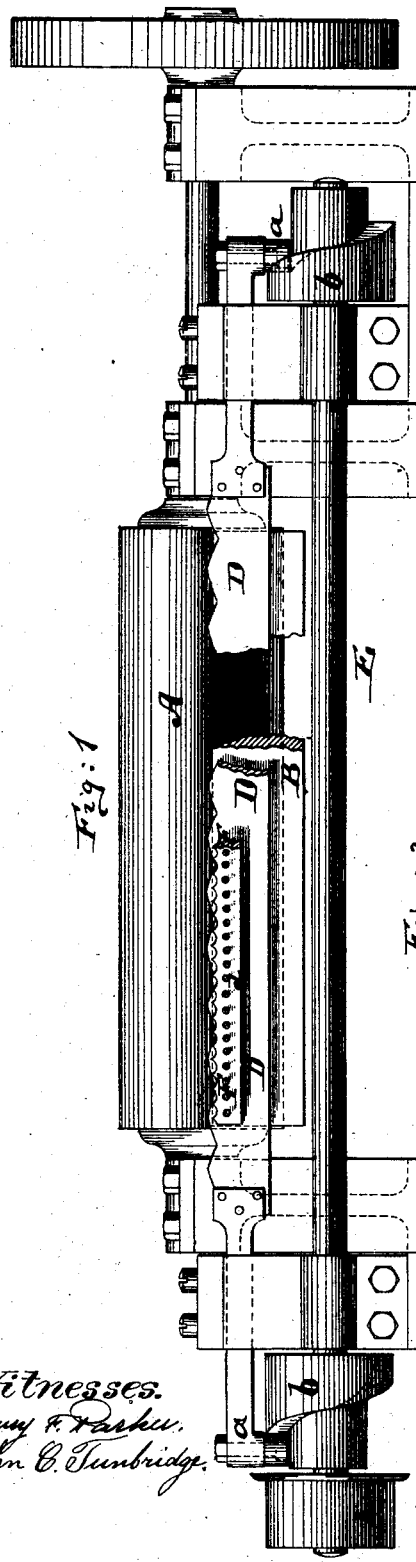
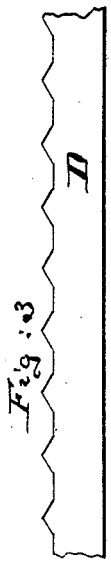
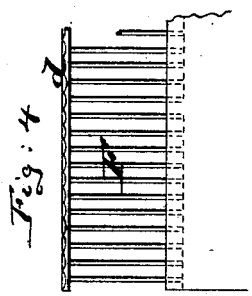
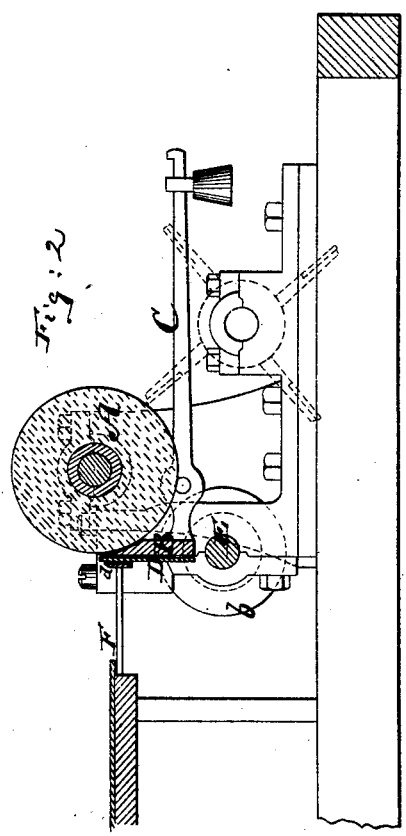

UNITED STATES PATENT OFFICE.

ISAAC P. MINER, OF BROOKLYN, NEW YORK, AND OLIVER T. JENNINGS, OF THE GLADES, GEORGIA, ASSIGNORS TO ABRAHAM G. JENNINGS, OF BROOKLYN, NEW YORK.

COTTON-GIN.

SPECIFICATION forming part of Letters Patent No. 245,086, dated August 2, 1881.

Application filed March 29, 1881. (No model.)

*To all whom it may concern:*

Be it known that we, ISAAC P. MINER, of Brooklyn, Kings county, New York, and OLIVER T. JENNINGS, of The Glades, in the county of Hall and State of Georgia, have invented a new and useful Improvement in Cotton-Gins, of which the following is a specification.

This improvement relates to what is commonly called the "roller-gin," in distinction from the saw-gin; and it relates more particularly to the devices by which the seed is separated from the cotton lint or fiber. In the saw-gin the lint is pulled by the teeth of the saw through the bars, that prevent the seed from following.

In the roller-gin now in use, generally known as the "McCarthy," the essential features are, first, the roller or drawing-cylinder, having a rough surface of leather to seize and draw the cotton-lint; second, a blade or bar tangential to the roller and close to it; and, third, a reciprocating blade that has an up-and-down motion, passing over a section of the roller, and the stationary blade separating the seed from the lint as it is drawn away by the roller.

The improvement we have made, instead of the straight square-edged blade moving up and down, consists of a straight plate or blade, made of steel or other hard metal, which is notched, serrated, or indented on the upper edge and reciprocated rapidly in a horizontal direction in front of the stationary blade and the roller. This serrated blade has a reciprocating or vibrating or alternate motion to the right and left of two inches, more or less, the effect of which is to violently shake, roll, and twist out the seed as the lint is drawn away by the roller and carried down between it and the stationary blade. The teeth or notches of this blade are one inch, more or less, apart, are beveled or inclined each way, and more or less pointed, as found best in practice, and the indentations are one-half inch, more or less, deep.

In the accompanying drawings, Figure 1 is a front elevation, partly in section, of a cotton-gin containing our invention. Fig. 2 is a vertical cross-section of the same; Fig. 3, a detail face view of the reciprocating notched blade; and Fig. 4, a detail top view of the grating, which is directly in front of the notched blade, and serves to support the cotton to be ginned and to let the seed drop down between its bars.

In the drawings, the letter A represents the roller of the cotton-gin. This roller is made with a rough or brushy surface for the purpose of enabling it to properly draw the lint, and is, to this end, either covered with leather or otherwise prepared to have a sufficiently frictional surface so that it will always cause the lint to adhere to it.

B is the stationary blade, secured to one or a series of weighted levers, C, so that thereby it is made to properly bear against the surface of the roller, as indicated in Fig. 2; but instead of making the blade B thus movable laterally, the roller may by suitable means, such as springs or the like, be pressed against the blade B, which in that case is quite stationary.

D is the reciprocating notched blade above referred to. Its ends are provided with projecting pins $a$, that take against the surfaces of cams $b$, which are mounted upon a rotary shaft, E, so that by revolving said shaft by suitable means reciprocating movement in a horizontal direction to the extent of about two inches, more or less, in a full-sized gin will be rapidly imparted to the blade D.

F is the grating, placed directly in front of the blade D and attached to the stationary frame-work of the gin. Its grate-bars are so spaced that the seed, when liberated from the lint, will readily pass through between them, and the upper edge of the front bar, $d$, of the grate is by preference made more or less undulating or notched, in order to facilitate the permanency of the cotton on its way to the roller; and this front bar, $d$, of the grating, inasmuch as it is close to the reciprocating blade D, also assists in guiding the latter properly, keeping it in the proper place. The steel notched or serrated reciprocating blade D is placed close to the stationary blade B and so much above it that the lowest part of the indentations are one-eighth to one-fourth of an inch below the upper edge of the stationary blade or bar B, that presses against the drawing-roller A. The plate B prevents all contact between roller A and blade D. Immediately in front of this reciprocating blade is the grid or grate F, through which the seeds, as they are separated, fall. This grid (which forms part of the table holding the cotton to be ginned) is made of perforated sheet metal, or, if preferred, of heavy wires separated sufficiently to allow the seed to pass through. The ends of these wires are fastened in the bar $d$, parallel to the reciprocating blade D, and about one-sixteenth of an inch in front of it, and about the same height, and notched as stated.

The usual doffer or brush for taking off the cotton from the roller is or may be used when required.

Only so much of the gin is shown in the drawings as is required to exhibit the invention.

The horizontal reciprocating blade D, for separating the seed from the cotton fiber, has its alternate motion given to it, as stated, by means of one or both cams $b$ on the shaft E, to which power is attached. This shaft is underneath the reciprocating blade D, a cam, $b$, on the shaft, each end of the blade, acting so as to pull the blade, as required, first to the right and then to the left, and so on rapidly. These cams are so nicely adjusted that there is no jar or lost motion in the movements. This method of giving alternate motion to the blade seems to be the best, although we are not confined to it, for by a suitable frame-work for the blade to stiffen it the blade can be moved by one cam that will push as well as pull it, or it can be moved by the common crank motion.

In this improved cotton-gin the feed of the unginned cotton to the roller is at no time cut off. Neither is the cotton fiber pinched, cut off, or broken, as it is in the McCarthy roller-gin, by the action of the separating-blade moving up and down against the edge of the stationary blade, sometimes cutting the cotton fiber like a pair of shears.

By having the teeth that project from the upper edge of the blade D beveled or inclined each way, as indicated in Fig. 3, the blade becomes effective for the purposes of loosening and throwing the seed in each of its two movements—that is to say, both while it moves to the right and while it moves to the left; and we regard this fact as an important feature of our invention, because our gin is thereby made continuously active where, in the McCarthy gin, the downward movement of the separating-blade was lost to the effectiveness of the gin.

We claim—

1. In a roller cotton-gin having drawing-roller A and stationary plate B, the horizontally-reciprocating blade D, having toothed or serrated upper edge and placed close to and in front of the plate B, but not in contact with roller A, and combined with mechanism for imparting rectilinear reciprocating motion to said blade D, substantially as described.

2. The combination of the roller A with the horizontally-reciprocating notched or toothed blade D and with the cam or cams $b$ on the shaft E, for imparting rectilinear reciprocating motion to said blade D, and with the plate B, which is interposed between the roller A and blade D, preventing contact between them, substantially as described.

3. In combination with the roller A and plate B, the horizontally-reciprocating blade D, and the grid or grating F, having notched front bar, $d$, substantially as described.

4. In a roller cotton-gin which is arranged to draw the lint in a lateral direction, the vertically-placed seed-loosening bar D, made with toothed upper edge and moved horizontally back and forth, to be effective at all times while moving in either direction in contact with a stationary plate, B, which separates it from the roller, substantially as described.

ISAAC P. MINER.
      OLIVER T. JENNINGS.

Witnesses for Isaac P. Miner:
 A. G. JENNINGS,
 WILLY G. E. SCHULTZ.

Witnesses for O. T. Jennings:
 CLAUD ESTES,
 J. B. M. WINBURN.